ELECTRON DISCHARGE TUBE AMPLIFYING, REPEATING AND MODULATING CIRCUIT ARRANGEMENTS

Filed May 1, 1947

INVENTOR.
Charles W. Rich
BY H. S. Grover
ATTORNEY

Patented Mar. 14, 1950 2,500,645

UNITED STATES PATENT OFFICE 2,500,645

ELECTRON DISCHARGE TUBE AMPLIFYING, REPEATING, AND MODULATING CIRCUIT ARRANGEMENTS

Charles Wilfred Rich, Chelmsford, England, assignor, by mesne assignments, to Radio Corporation of America, New York, N. Y., a corporation of Delaware Application May 1, 1947, Serial No. 745,316
In Great Britain February 21, 1946

Section 1, Public Law 690, August 8, 1946
Patent expires February 21, 1966

6 Claims. (Cl. 332—37)

Figures 1, 2:
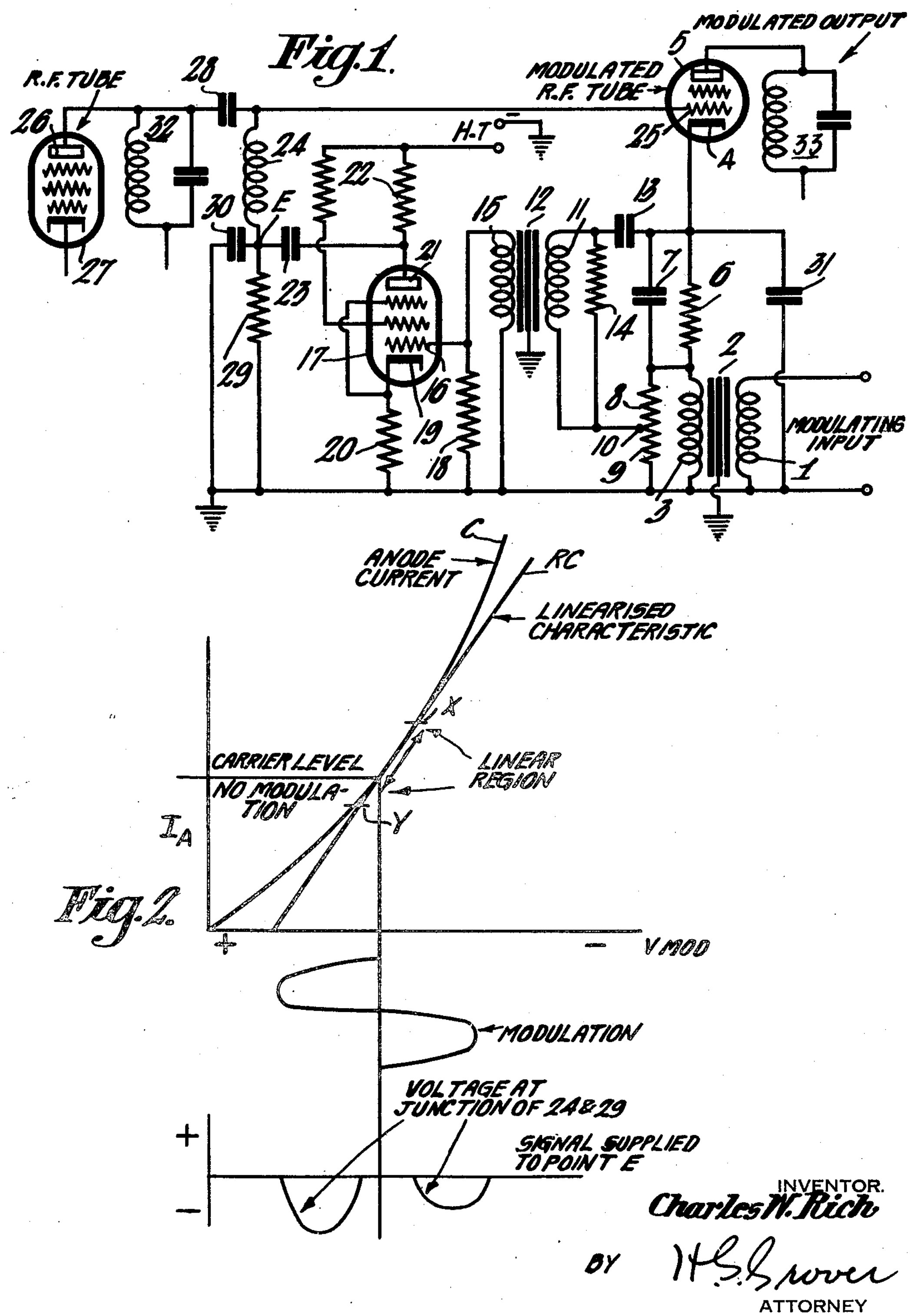

This invention relates to electron discharge tube amplifying, repeating and modulating circuit arrangements. The invention is primarily designed for use in connection with carrier wave modulating circuits and the major part of the description given herein is concerned with such circuits. The invention is, however, not exclusively limited to this use but as will appear later is applicable to amplifiers and generally to arrangements in which a rectilinear relationship between output current and input voltage is required.

The cathode method of modulating a carrier transmitter is very popular for low power transmitters and in particular mobile transmitters for the reason that the modulating power required is only a fraction of the transmitter output power so that high over all efficiency and low size and weight of the modulator unit are easily achievable. This method of modulation, however, presents a defect that owing to the non-rectilinearity of the anode current-grid voltage characteristics of tubes, distortion is introduced by the modulator stage, this distortion increasing as the depth of modulation increases. In practice the depth of modulation permissible with known cathode modulator arrangements is about 75%, the distortion increasing so rapidly thereafter as usually to be regarded as becoming intolerable. This limitation in permissible depth of modulation moreover results in loss of range due to the fact that the full power of the transmitter is not utilised while the signal-to-noise ratio for a given amount of noise is reduced as compared to that which would apply were 100% modulation depth achieved.

The present invention seeks to overcome the above mentioned difficulties and defects and to provide an improved cathode modulation arrangement in which 100% modulation or nearly 100% can be achieved without serious or substantial distortion. This object is obtained by means of a circuit arrangement whereby the effects of non-rectilinearity of the tube characteristic are compensated for.

The achievement of a rectilinear relation between the modulating signal and modulated output over a complete cycle of modulation results in an extremely small percentage of harmonic distortion for a 100% modulated carrier. Further since the tube characteristic is in effect made rectilinear and of a slope substantially higher than the mean slope of a non-rectilinear characteristic over one cycle of modulation, a modulating signal of smaller amplitude can be employed than is the case with a known transmitter arrangement of comparable design.

According to this invention an electron discharge tube amplifying repeating or modulating circuit arrangement comprises an electron discharge tube, means for applying input voltage to an electrode of said tube, means for deriving from a circuit including said tube a voltage dependent upon departures of said tube from rectilinearity of response, and means for utilising the derived voltage to apply to another electrode of said tube a correcting voltage to correct for said departures.

According to this invention as applied to a cathode modulator circuit arrangement, modulating input is applied across an impedance forming part of a network in the cathode leg of a tube having a carrier input applied to another electrode, and means are provided for deriving from another point of said network a voltage dependent upon departures of said tube from rectilinearity and for utilising said voltage to provide compensating voltage to an input electrode of said tube other than the cathode.

The invention is illustrated in and further explained in connection with the accompanying drawing.

Referring to Fig. 1 which shows diagrammatically one way of carrying out this invention audio frequency or other modulating input is applied to the primary winding 1 of a low frequency transformer 2 with its secondary 3 included between earth or frame and the cathode 4 of the tube 5 on which modulation is to be effected, the end of the secondary 3 remote from earth being connected to the cathode 4 through a resistance 6. A condenser 7 is connected in parallel with resistance 6 and a resistance consisting of two series portions 8, 9 is connected in parallel with the secondary 3. A tap 10 between the resistance portions 8, 9 is connected through the primary 11 of a second transformer 12 and a blocking condenser 13 to the cathode 4. A third resistance 14 is connected in parallel with the primary 11. The secondary 15 of transformer 12 is connected between the control grid 16 of an amplifier tube 17 and earth and is shunted by the usual resistance 18, the cathode 19 of the tube 17 being connected to earth through a resistance 20. The anode 21 of tube 18 receives anode potential from a source (not shown) connected at HT through an anode resistance 22 and is connected by a condenser 23 in series with an inductance 24 to the control grid 25 of the first tube 5. The anode 26 of a third tube 27 which supplies carrier input is connected through a condenser 28 to the control grid 25 of the first or modulated tube 5 the said condenser 28 and the inductance 24 having one terminal common as shown. The other terminal of the said inductance 24 is connected to earth through a resistance 29 shunted by a carrier frequency by-pass condenser 30 and another carrier frequency by-pass condenser 31 is connected between the cathode 4 of the modulated tube 5 and earth. The blocking condenser 13 in the circuit of the primary 11 of the transformer 12 enables this transformer to be of the high permeability iron cored type.

The tapped resistance 8—9 across the secondary of the modulation input transformer 2 constitutes a potential divider; the resistance 14 across the primary 11 of the second transformer 12 prevents excessive phase shift at low frequencies; and the condenser 7 across resistance 6 provides phase correction at high frequency and compensates for phase shift introduced by the carrier frequency by-pass condenser 31 across the cathode leg. 32, 33 are carrier frequency tuned circuits, the circuit 33 being coupled to the output electrodes of tube 5, including cathode 4, in the usual way.

The operation of the above arrangement will now be described with reference to Fig. 2 which is a conventional graphical representation. In the upper part of this figure the curve C represents the anode current, ($I_A$)—grid (modulating) voltage (V mod) of tube 5 and has a substantially rectilinear portion between X and Y. It will be clear that the apparent cathode impedance of the tube 5 will remain constant at the value it has in the absence of a modulating signal input so long as the said input modulating signal does not cause the tube to operate outside the rectilinear region XY of its characteristic. As soon however as the modulating amplitude becomes high enough to cause the operating point to move outside the rectilinear region XY the apparent cathode impedance will change considerably from that at carrier level and will vary over a modulation cycle. Since, however, the modulating signal is not applied directly to the cathode of the tube 5 but through the resistance 6, the potential developed across this resistance will be proportional to the input only so long as the modulated tube 5 is operating rectilinearly. As soon as there is departure from rectilinearity the potential across this resistance will no longer be directly proportional to the modulating input but will depend upon the new value of apparent cathode impedance. The ratio of the resistance portions 8, 9 on either side of the tap 10 are so chosen that the potential developed across resistance portion 8 is equal to and in opposite phase with the potential across resistance 6. Thus so long as the operating point remains on the rectilinear part XY of the characteristic no current will flow in the branch of the network between the cathode 4 of the modulated tube and the tap 10.

So soon, however, as departure from rectilinearity occurs a potential difference will be set up between the cathode 4 and the tap 10. This potential difference is applied through the transformer 12 and the second or amplifying tube 17 to the control grid 25 of the modulated tube 5, the sense of the connections being such that the phase of the potential applied to the modulated tube compensates or substantially compensates for effects of departure of said modulated tube from rectilinearity. The result therefore, is to produce the effect of a substantially rectilinear characteristic as shown at RC. The central portion of Fig. 2 represents a full wave of modulating voltage input and the lowest portion represents the consequent voltage which appears at the junction of inductance 24 with resistance 29. As above stated the invention is not limited to modulated carrier arrangements. For example, it could be applied to amplifier tube arrangements to give a rectilinear relation between output and input. In such a case the transformer 2 of Fig. 1 would be replaced by an ordinary signal input transformer or equivalent device and the tube 5 would be the amplifier tube whose non-rectilinearity is to be compensated for and would, of course, only receive one type of input.

In the arrangement of Fig. 1 the power taken by the tube 17 through which the compensating voltage is applied to tube 5 is quite small and more than compensated for by the resulting increased efficiency of the said tube 5.

What is claimed is:

1. An electron discharge tube repeating circuit arrangement, comprising an electron discharge tube having output electrodes including a cathode and having a grid, said cathode being connected to a point of reference potential by a resistor and reactor in series, connections for applying input voltages across said reactor in the cathode leg of said tube, a resistor in shunt to said reactor, a tap on said last-named resistor for deriving a voltage dependent upon departures of said tube from rectilinearity of response to said input voltages, and a circuit coupling said tap to the grid of said tube for utilizing the derived voltage to apply to said grid of said tube a correcting voltage to correct for said departures.

2. A repeating circuit as recited in claim 1 wherein said coupling circuit includes an electronic amplifier device.

3. A repeating circuit as recited in claim 1 wherein said input voltages represent modulating signals and wherein apparatus excited by carrier current to be modulated is coupled to said grid.

4. In a linear system for relaying and modulating alternating currents, a tube having input electrodes including a grid and a cathode and having output electrodes including an anode coupled to an output circuit, connections to said grid for applying alternating current to be modulated thereto, a resistor and a reactor in series coupling the cathode of said tube to ground, connections for impressing modulating potentials on said reactor, a potentiometer in shunt to said reactor, a transformer having a secondary winding and having a primary winding coupled to said cathode and to a point on said potentiometer, an electron control device having input electrodes coupled to the secondary winding of said transformer and having output electrodes, an inductance and a resistor in series between the input electrodes of said first-named tube, and a coupling between the output electrodes of said device and the junction point of said inductance and said resistor.

5. A system as recited in claim 4 wherein the ratio of the values of the portion of said potentiometer adjacent said first resistor and of said first resistor are such that the potentials developed thereacross are equal.

6. An electron discharge tube repeating circuit arrangement, comprising an electron discharge tube having output electrodes including a cathode and having a grid, a resistive circuit connecting said cathode to a point of reference potential, connections for applying input voltages to said resistive circuit in the cathode leg of said tube, means coupled to said cathode circuit for deriving a voltage dependent upon departures of said tube from linearity of response to said input voltages, and a circuit coupling said means to the grid of said tube for utilizing the derived voltage to apply to said grid of said tube a correcting voltage to correct for said departures.

CHARLES WILFRED RICH.

REFERENCES CITED

The following references are of record in the file of this patent:

UNITED STATES PATENTS

| Number | Name | Date |
|---|---|---|
| 2,114,336 | Ditcham | Apr. 19, 1938 |
| 2,261,335 | Braden | Nov. 4, 1941 |
| 2,335,796 | Schrader et al. | Nov. 30, 1943 |
| 2,372,101 | Madsen | Mar. 20, 1945 |
| 2,424,830 | Kenefake | July 29, 1947 |